United States Patent [19]

Krueger et al.

[11] Patent Number: 4,635,740

[45] Date of Patent: Jan. 13, 1987

[54] ENDLESS TRACK ATTACHMENT FOR A WHEELED VEHICLE

[76] Inventors: David W. Krueger, Box 524; Raymond A. Yerigan, Rte. 3, both of Grantsburg, Wis. 54840

[21] Appl. No.: 696,734

[22] Filed: Jan. 31, 1985

[51] Int. Cl.$^4$ .............................................. B62D 55/04
[52] U.S. Cl. .................................. 180/9.21; 180/9.26
[58] Field of Search ................... 180/9.21, 9.26, 9.28, 180/9.30, 210, 215; 280/7.1

[56] References Cited

U.S. PATENT DOCUMENTS

| D. 227,882 | 7/1973 | Williams | 180/9.24 |
|---|---|---|---|
| 2,627,442 | 2/1953 | Junker | 180/9.26 |
| 3,039,828 | 6/1962 | Johnson | 180/5 R |
| 3,157,913 | 11/1964 | Hubert | 180/9.24 |
| 3,412,820 | 11/1968 | Wachholz | 180/5 R |
| 3,638,746 | 2/1972 | Gostomski | 180/210 |
| 3,872,938 | 3/1975 | DeGroot | 180/9.24 |
| 3,930,553 | 1/1976 | Kopera et al. | 180/9.28 |
| 4,362,340 | 12/1982 | van der Lely | 180/9.21 |
| 4,463,964 | 8/1984 | Takayanagi et al. | 180/215 |

Primary Examiner—John J. Love
Assistant Examiner—Donn McGiehan
Attorney, Agent, or Firm—Merchant, Gould, Smith, Edell, Welter & Schmidt

[57] ABSTRACT

The present invention is directed to an attachment for converting a three or four wheel recreational vehicle to a tracked vehicle. An auxiliary frame supported by a pair of auxiliary wheels is attached to lower and upper members of the main frame of the vehicle such that the rear wheels of the vehicle are unweighted thereby shifting weight to the auxiliary wheels and the front wheel or wheels. Tracks are installed on each pair of a rear wheel and auxiliary wheel.

11 Claims, 7 Drawing Figures

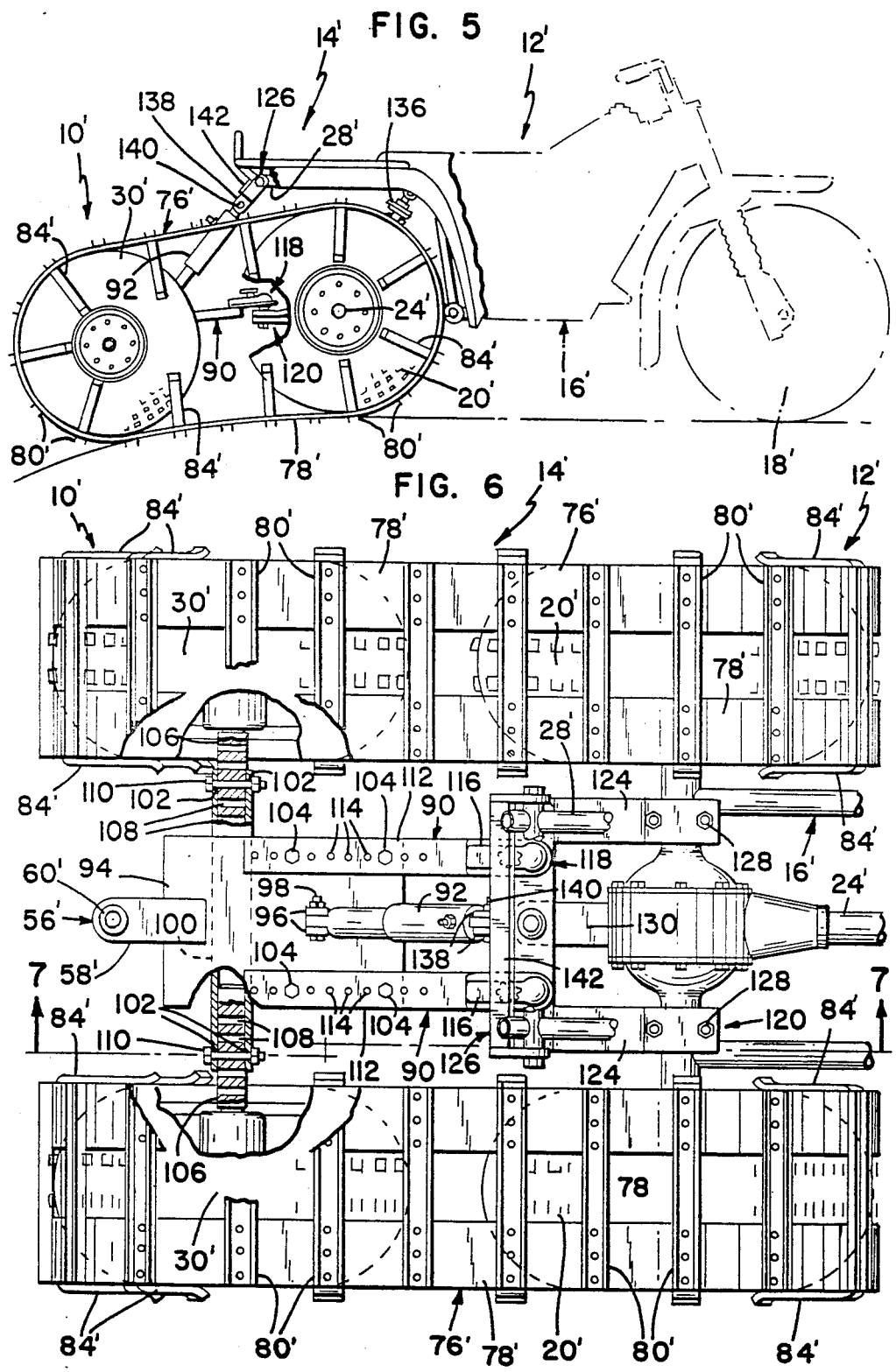

ENDLESS TRACK ATTACHMENT FOR A WHEELED VEHICLE

FIELD OF THE INVENTION

The present invention is directed to an attachment for three or four wheel vehicles which converts the rear driven wheels to endless tracks.

BACKGROUND OF THE INVENTION

Three and four wheel recreational vehicles have recently become quite popular. The tires are ordinarily large with respect to the vehicle and filled to a rather low pressure so they are fairly soft. The vehicles can be driven in snow, sand and various off-road locations and terrain. The vehicles are particularly popular in the desert, in woodland areas, along sea shores, and in other lowly inhabited areas. It has been found, however, that these vehicles do have limitations with respect to the terrain through which they can pass. In particular, deeper snow and swampy areas are generally impassible. The present invention is directed to adding an endless track attachment to these recreational vehicles to give them greater capability in terrain now impassible.

Such endless track attachments for three and four wheel recreational vehicles of the indicated type are not known. The art does show endless track attachments for motorcycles (see e.g., U.S. Pat. No. 3,412,820 and U.S. Pat. No. 3,872,938) and trail scooters (see e.g., U.S. Pat. No. 3,157,913). In addition, there are track attachments for tractors (see e.g., U.S. Pat. No. 3,039,828) and four wheel passenger vehicles (see e.g., U.S. Pat. No. 2,627,442). Also, snowmobiles have tracks at one end and are well known.

SUMMARY OF THE INVENTION

The present invention is directed to an endless track attachment for a wheeled vehicle wherein the vehicle has a pair of rear wheels. The attachment includes a frame and a pair of auxiliary wheels rotatably attached to the frame. Mechanism for attaching the frame to the vehicle including mechanism for shifting a portion of the weight of the vehicle from the rear wheels of the vehicle to the auxiliary wheels of the attachment is included. A pair of endless tracks are entrained about each combination of a back wheel of the vehicle and an auxiliary wheel of the attachment.

In one embodiment, the attachment includes auxiliary wheels of a size similar to the rear wheels of the vehicle. The frame of the attachment includes a pair of spaced-apart, triangular shaped subframes having upwardly inclined forward and rearward members. The axle of the auxiliary wheels is fastened near the bottom of the upwardly inclined forward members and may be adjusted along the members. The upper end of the forwardly inclined members is attached with a pair of links to an upper support on the main frame of the vehicle. A turnbuckle member is attached between a rear hitch on the vehicle and connecting members attached to the rearwardly inclined members of the subframes at a location above the axle of the auxiliary wheels. The axle is emplaced along the inclined forward members, and the turnbuckle is tightened until the weight of the vehicle is redistributed so as to apply more weight to the front wheel or wheels of the vehicle and to the auxiliary wheels of the attachment and less weight to the rear wheels of the vehicle. Such redistribution of weight is necessary to provide good steering capability, since if the weight of the attachment were added at the rear of the vehicle without distributing some weight forwardly, the rear wheels would act as a fulcrum to actually relieve weight from the front wheel or wheels thereby making steering more difficult than before the attachment, if not impossible. As indicated previously, endless tracks are also entrained about the rear wheel and auxiliary wheel combinations. The present attachment, therefore, is not only advantageous in that it provides increased capability with respect to traversing otherwise inhospitable terrain, but also redistributes the weight of the vehicle to enhance steering capability.

In a second embodiment, the attachment is different in that a pair of adjustable, rigid members extend between the auxiliary frame and a lower support of the main frame of the vehicle. A shock absorber extends from the auxiliary frame upwardly to an upper support of the main frame of the vehicle. The auxiliary frame is itself different, although such difference is of only passing interest and not particularly important to function. With this embodiment, the rigid members and shock absorber are attached so that the rear wheels of the vehicle are lifted to obtain the weight distribution for enhancing steering indicated above. Of further advantage with the present embodiment is that both the back wheels of the vehicle and the auxiliary wheels of the attachment follow the contour of the ground rather closely as the suspension system of the vehicle and the shock absorber of the attachment function.

These advantages and other objects obtained by the invention are shown in the drawings and are explained in detail hereinafter with respect to the preferred embodiment.

BRIEF DESCRIPTION OF THE DRAWINGS

FIG. 5 shows a side elevational view of an alternate embodiment of the present invention as attached to a three wheel recreational vehicle;

FIG. 6 shows a top plan view, with portions broken away and portions in partial cross section, of the attachment and a portion of the rear of the vehicle.

DETAILED DESCRIPTION OF THE PREFERRED EMBODIMENT

Figure 1:
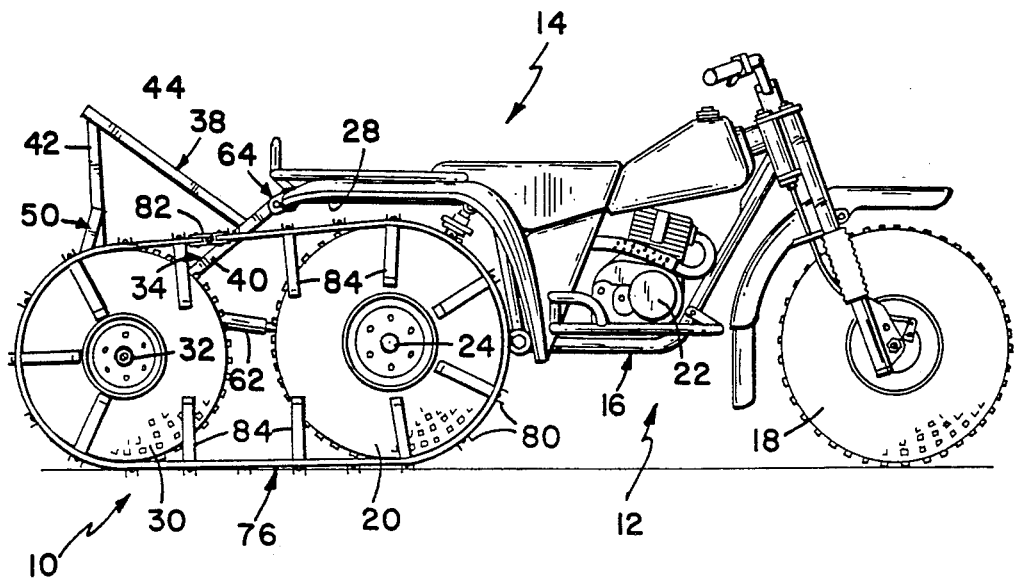
FIG. 1 shows a side elevational view of an endless track attachment in accordance with the present invention as attached to an appropriate three wheel recreational vehicle.
Figure 2:
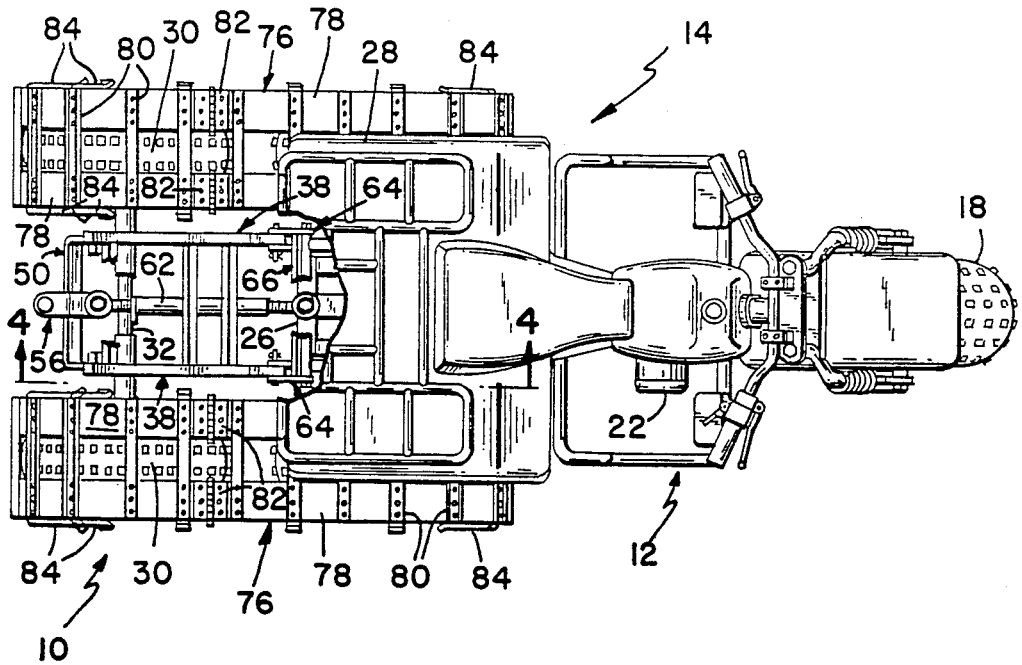
FIG. 2 shows a top plan view, partially cut away, of the apparatus of FIG. 1.

Referring now to the drawings wherein like reference numerals designate identical or corresponding parts throughout the several views, and more particularly to FIG. 1, an endless track attachment in accordance with the present invention is designated generally by the numeral 10. Attachment 10 is shown attached to vehicle 12 to create an endless track combination vehicle 14. Vehicle 12 is shown as a three wheel vehicle having a main frame 16 with a single front wheel 18 and a pair of rear wheels 20 mounted thereto. It is understood, however, that the present invention is equally usable and advantageous with a four wheel recreational vehicle. Main frame 16 supports a drive mechanism 22, such as a gasoline motor and gearing system. Drive mechanism 22 drives rear wheels 20. Frame 16 includes lower members 24 to which a rear hitch 26 is connected and upper members 28 which support fenders, seat, equipment rack and/or any other attachments generally above rear wheels 20.

Figure 3:
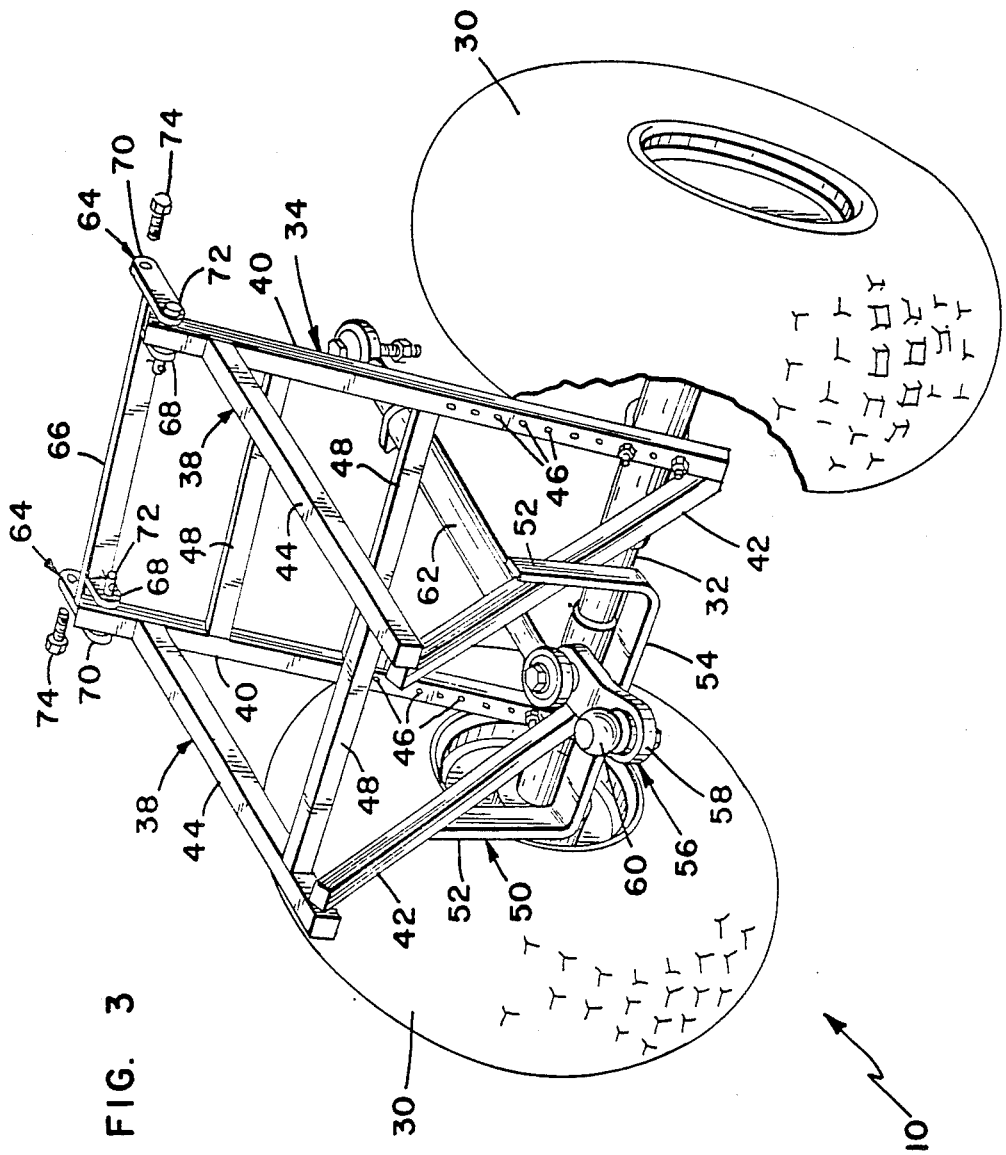
FIG. 3 is a perspective view of the present attachment invention, without endless tracks.
Figure 4:
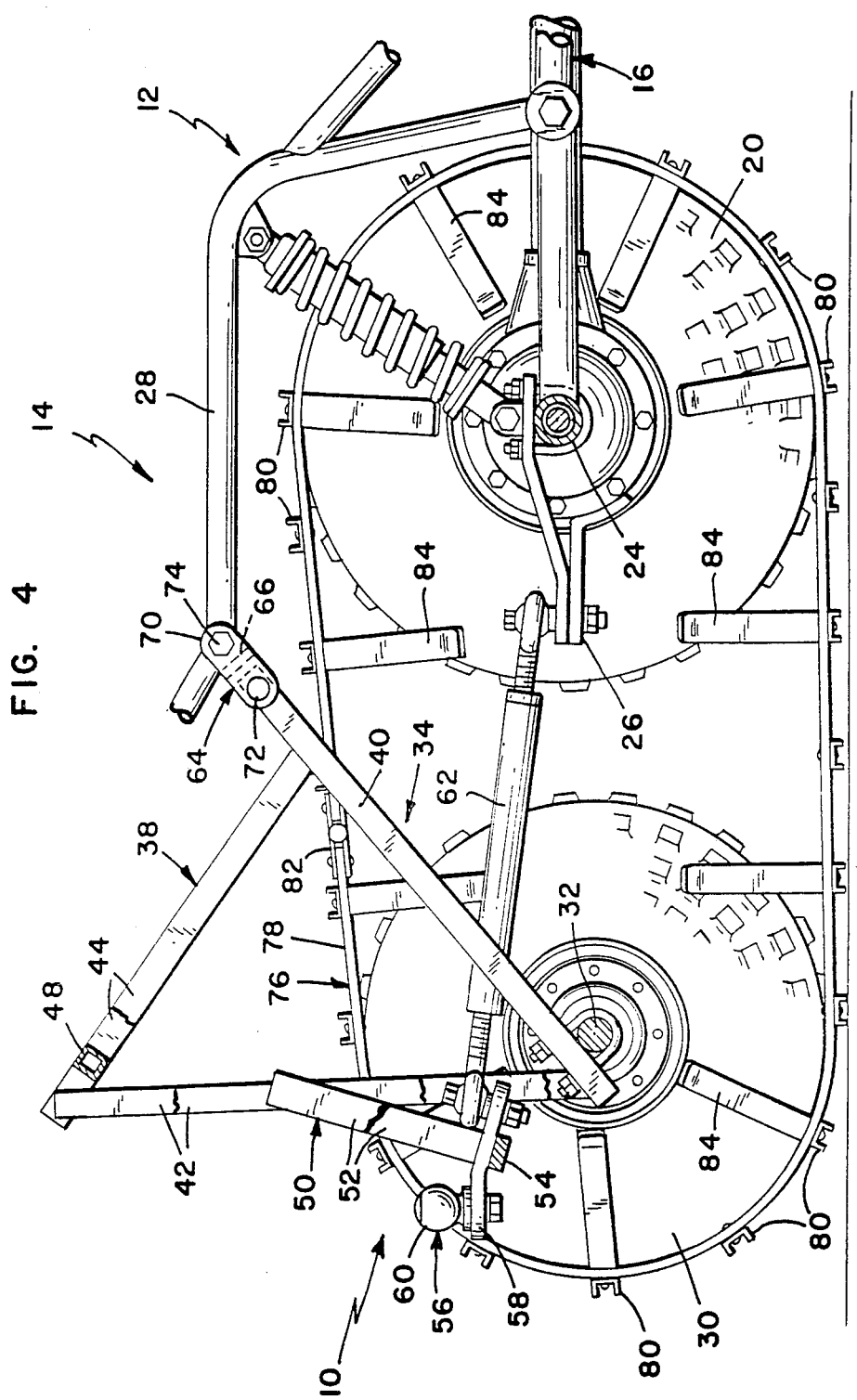
FIG. 4 is an enlarged, cross-sectional view including the rear, lower portion of the recreational vehicle with the invention attached, taken generally along line 4—4 of FIG. 2.

As shown in FIG. 3, attachment 10 includes a pair of auxiliary wheels 30 mounted on an axle 32 which is held to an auxiliary frame 34 by a pair of U-bolts 36. Frame 34 includes a pair of spaced-apart, triangular subframes 38. Each subframe 38 is comprised of upwardly inclined, forward and rearward members 40 and 42 with a cross member 44 extending therebetween. Members 40, 42 and 44 are fastened together by welding or other known fastening mechanisms to form a triangle. Each upwardly inclined forward member includes a plurality of regularly spaced openings 46 for receiving U-bolts 36 such that axle 32 may be attached at various positions along forward members 40. A plurality of connect members 48 are attached at opposite ends between the pair of subframes 38 to form frame 34.

A bracket 50 extends between rearward members 42 of subframes 38 at a location approximately midway between the ends of member 42. Bracket 50 in the embodiment shown has a U-shape with legs 52 extending upwardly for attachment to members 42 and base 54 extending between legs 52. An auxiliary hitch 56 is attached to base 54 of bracket 50. Hitch 56 includes bar 58 attached to base 50 about midway between legs 52 and ball 60 fastened to the rear end of bar 58. An elongated turnbuckle 62 is attached to the forward end of bar 58 and connects to rear hitch 26 of vehicle 12. Rear hitch 26 is preferably a ball hitch since turnbuckle 62 must be pivotably attached to allow up and down movement of attachment 10 with respect to vehicle 12. In the conventional fashion, turnbuckle 62 has an outer shell with opposite directed threads at opposite ends for receiving mating rods so that when the shell is turned, turnbuckle 62 either contracts or extends.

Attachment 10 is attached at the upper ends of forwardly inclined members 40 of auxiliary frame 34 to one or more upper members 28 of mainframe 16 of vehicle 12. Forward members 40 are connected by a pair of links 64 to an upper member 28 of mainframe 16. Links 64 are held spaced apart by a connecting member 66. Each link 64 includes a shorter, inner plate member 68 and a longer, outer plate member 70. It is preferable for connect member 66 to have a flat shape and extend between outer members 70 of the spaced apart link 64. Inner members 68 are then attached to connect members 66. Each upwardly inclined auxiliary frame member 40 has a flat, squared off top which is received between inner and outer members 68 and 70 and mates closely with the flat bottom of the connecting member between inner and outer members 68 and 70, preferably connect member 66 to limit the rotational motion of links 64 with respect to attachment 10. In this fashion, links 64 are able to transfer weight from vehicle 12 to attachment 10 as discussed hereinafter. Links 64 are pivotably attached to forward members 40 with conventional fastening elements 72, such as a headed pin and cotter key, and to upper member 28 of main frame 16 with nut and bolt combinations 74 or other conventional attachment mechanism.

With auxiliary frame 34 attached to main frame 16, endless tracks 76 are entrained about each combination of one of rear wheels 20 and one of auxiliary wheels 30. Track 76 may be fashioned in a variety of ways, but the preferred embodiment includes a pair of flexible belts 78 held spaced apart by a plurality of regularly spaced cleats 80 riveted or otherwise attached to belts 78. Belts 78 are sufficiently spaced so that a portion of the tires of wheels 20 and 30 protrude between belt 78 to contact cleats 80. Belt 78 may also include a latch mechanism 82 for severing the track, if desired, for installation or removal purposes. Retainer legs 84 extend inwardly from cleats 80 on both sides of track 76 to prevent track 76 from turning off wheels 20 and 30. As rear wheels 20 are driven by drive mechanism 22, the lowly pressurized tires of rear wheels 20 deform about cleats 80 and therefore engage cleats 80 and belts 78 to turn tracks 76.

During development, it was found that if attachment 10 is pulling on upper frame member 28, wheels 20 act as a fulcrum and to some extent remove weight from front wheel 18. If very much weight is removed from front wheel 18, steering is made very easy, but also very ineffective since there isn't sufficient friction applied to the ground to effect a turn of the vehicle. Consequently, it was found that it is necessary for attachment 10 to shift the weight of the rear portion of vehicle 12 from rear wheels 20 to auxiliary wheels 30 and to front wheel 18. Such additional weight on forward wheel 18 then enhances the steering capability of vehicle 12, especially when it is modified to have the greater driving traction of endless tracks. Attachment 10 accomplishes the shifting of weight when forwardly inclined members are sufficiently long to lift the back of vehicle 12 at upper frame members 28.

To use attachment 10, links 70 are attached to upper frame members 28 at nut and bolt combinations 74. Turnbuckle 62 is extended sufficiently to attach its forward end to rear hitch 26. Turnbuckle 62 is then turned to bring auxiliary wheels 30 close to rear wheels 20. Tracks 76 are installed on each combination of a rear wheel 20 and auxiliary wheel 30. Turnbuckle 62 is then turned to separate rear wheels 20 and auxiliary wheels 30 until tracks 76 are appropriately tight. As discussed hereinbefore, it is important that the rigid turnbuckle connection between main frame 16 and auxiliary frame 34 cooperate with forwardly inclined members 40 so that links 70 push upwardly on upward support members 28 to lift the rear portion of vehicle 12 and rear wheels 20 carry only a small portion of the weight of the vehicle 12. Some weight is then shifted to forward wheel 18. U-bolts 36 provide the adjustment to insure that the proper weighting and proper separation between the sets of wheels is accomplished. That is, the attachment of axle 32 to inclined members 40 may be moved upwardly or downwardly thereby shortening or lengthening the distance between axle 32 and upper frame support 28 and thereby shifting more or less of the weight from rear wheels 20. The movement of axle 32 is accomplished by removing U-bolts 36 and installing them in an appropriate set of openings 46 nearer or farther from links 70.

Figure 7:
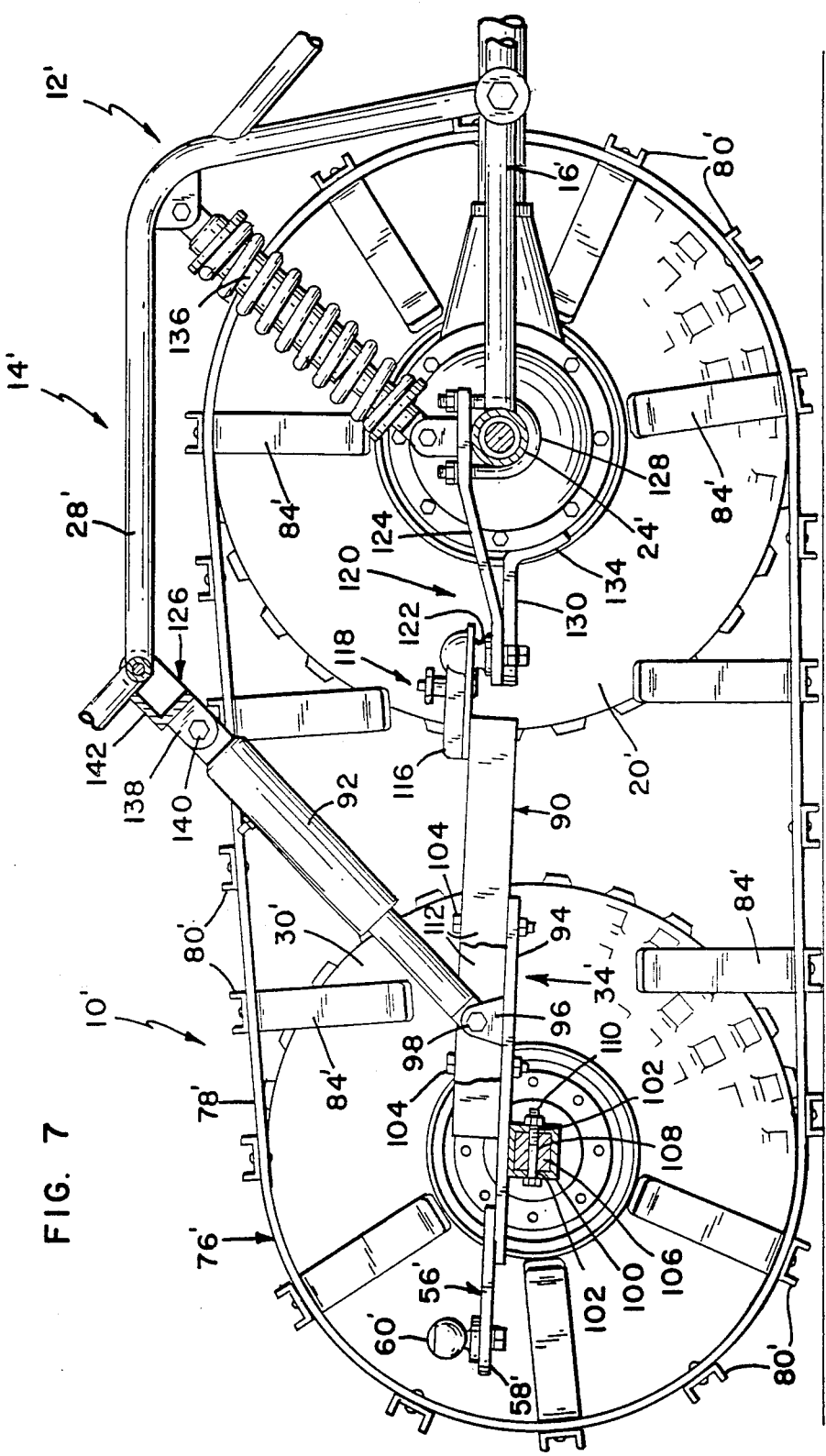
FIG. 7 is a cross-sectional view taken along line 7—7 of FIG. 6.

In a later developed embodiment, now actually preferred, the auxiliary frame and connections to the main frame of vehicle 12 differ from the earlier described embodiment. The present embodiment is described hereinbelow using the same numerals for the same parts described with respect to the first embodiment, except the numerals are primed. As shown in FIGS. 6 and 7, attachment 10' includes an auxiliary frame 34' to which back wheels 30' are rotatably attached. Auxiliary frame 34' is attached to main frame 20' of vehicle 12' at a lower frame support 24' with a pair of rigid members 90 and to an upper member 28' with shock absorber 92. A similar track 76' described hereinbefore is entrained about each set of a back wheel 20' and an auxiliary wheel 30'.

Auxiliary frame 34' includes a plate 94 having an auxiliary hitch 56' attached to the top rear portion of the plate and a pair of upwardly extending tabs 96 attached to the top forward portion of the plate. Tabs 96 have openings therein. One end of a conventional shock 92 is received between the tabs and fastened thereto through the openings with a nut and bolt combination 98. A tube 100 is fastened transversely across the bottom rear portion of plate 94. Each end of tube 100 extends beyond the side edges of plate 94. Each end of tube 100 has an opening 102 for a purpose described hereinafter. Plate 94 further includes a pair of spaced-apart openings along the forward portion of each side edge for the purpose of receiving fastening nut and bolt combinations 104 for connect members 90.

An axle 106 fits into each end of tube 100. Each axle 106 includes a plurality of spaced apart passages 108. A nut and bolt combination 100 fastens an axle 106 at one of passages 108 to an opening 102 in tube 100. An auxiliary wheel 30' is mounted on each axle 106 in a conventional fashion. The plurality of passages 108 in each axle 106 provide an adjustability with respect to the separation distance of auxiliary wheels 30' so that wheels 30' may be separated the same distance as back wheels 20' depending on the particular vehicle 12'.

Rigid connect members 90 are shown as square tubes 112 having a plurality of openings 114 which may be aligned with the openings in plate 94 for attachment thereto with nut and bolt combinations 104. The female portion 116 of a ball hitch is attached at the forward end of each of tubes 112.

Connect members 90, as indicated hereinbefore, are connected with ball hitches 118 at the rear end of vehicle 12'. A typical assembly 120 for mounting the male ball portion 122 of ball hitches 118 includes a pair of spaced apart elongated legs 124 made of plate material with a cross member 126 fastened between them at the rear ends of legs 124. The forward ends of legs 124 are clamped with U-bolts 128 to a lower frame member 24', which may be in fact be the axle for vehicle 12'. The ball portions 122 of hitches 118 are fastened in the usual way to cross bar 126. Ball portions 122 are spaced so as to receive the female portions 116 of hitches 118 fastened on connect members 90. The ball portions are centered about the centerline of vehicle 12'. A stabilizing member 130 extends forwardly from the center of cross bar 126 to contact with a downwardly extending portion 132 the housing 134 of vehicle 12'. Stabilizer member 130 and portion 134 hold bracket assembly 120 in place.

One or two shock absorbers 136 provide suspension for vehicle 12' between frame members and back wheels 20'. Depending on the vehicle, other types of suspension, such as torque arms, or even no suspension may be present.

As indicated hereinbefore, shock absorber 92 extends between the tabs 96 of auxiliary frame 34' and a similar pair of tabs 138 attached to an upper frame angle member 142 of vehicle 12'. A nut and bolt combination 140 provides a pivotal connection between shock absorber 92 and tabs 138.

In use, attachment 10' is installed on vehicle 12' to convert it from a three or four wheel vehicle to a track vehicle as indicated hereinafter. A bracket assembly 120, which is exemplary and may differ depending on the type of vehicle 12', is installed by tightening U-bolts 128 about lower frame member 24' of vehicle 12'. Bracket assembly 120 is centered with respect to the longitudinal centerline of vehicle 12'. A pair of tabs 138 are fastened to an upper frame member, such as angle 142 extending between upper frame members 28'. The pair of connect members 90 are then fastened with nut and bolt combinations 104 to plate 94 so that when attachment 10' is completely installed, the weight on the back wheels 20' of vehicle 12' is shifted mostly to auxiliary wheels 30' and forward wheel 18'. The back end of vehicle 12 is then lifted and auxiliary wheels 30' are rotated about the ball 122 of hitches 118 to bring auxiliary wheels 30' and back wheels 20' of vehicle 12' as close together as possible. A track 76 is next installed on each set of one auxiliary wheel 30' and one back wheel 20'. Vehicle 12' is lowered so that auxiliary wheels rotate upwardly away from rear wheels 20' and tighten endless tracks 76. Shock absorber 92 is then attached at nut and bolt combinations 98 and 140 between tabs 96 of plate 94 and tabs 138 attached to an upper frame member 142. As indicated hereinbefore, shock 92 and connect members 90 are installed such that shock absorber 92 lifts the rear end of vehicle 12' so that back wheels 20' support very little if any weight of vehicle 12'. Rather, the weight is redistributed so that front wheel 18' and auxiliary wheels 30' support most of the weight of vehicle 12'. In this fashion, front wheel 18' makes good frictional contact with the ground to enhance the steering capability of vehicle 12'.

Use of shock absorber 92 as opposed to the rigid members of the first embodiment, allows the endless tracks 96' to better conform to irregularities, including hills and valleys in the terrain. For example, vehicle 12' is shown in FIG. 5 on a hill wherein auxiliary wheels 30' have dropped downwardly so that endless track 76' can follow the contour of the hill. In like fashion, auxiliary wheels 76' can move upwardly so that the vehicle can pass through a valley in the terrain and still allow track 76' to better conform to the ground. In addition, the suspension system of vehicle 12' is also able to function as back wheels 20' support more or less of vehicle 12' weight due to irregularities in the ground.

Although the preferred embodiment of the present invention is shown with a single shock absorber 92 extending upwardly to an upper frame member, it is understood that the present embodiment would function equally well by interchanging the location of shock absorber 92 with connect members 90. That is, connect members 90 could extend between plate 94 and angle 142 while shock absorber 92 extended between plate member 94 and bracket assembly 120. Also, more than one shock absorber 92 may be used.

As indicated, the present invention is appropriate for either three or four wheel recreational vehicles and serves to greatly enhance the traction capability of the vehicle by converting the driving mechanism from a pair of rear wheels to a pair of endless tracks. The attachment further serves to shift the weight of the vehicle in a fashion which enhances the steering capability of the vehicle. With increased capability in drive traction and in steering, the recreational vehicle can travel a variety of more formidable terrains than otherwise possible. Even though the preferred embodiment and an alternate to the present invention has been set forth in detail and numerous advantages described, however, it is understood that changes may be made. Therefore, changes in matters of shape, size, arrangement and equivalent elements, to the full extent extended by the general meaning of the terms in which the appended claims are expressed, are understood to be within the principle of the pesent invention.

What is claimed is:

1. An endless track attachment for a wheeled vehicle, said vehicle having at least one front wheel and a pair of rear wheels, said attachment comprising:
    a frame;
    a pair of auxiliary wheels rotatably attached to said frame;
    means for attaching said frame to said vehicle, said attaching means including means for shifting a portion of the weight of said vehicle from said rear wheels to said auxiliary wheels and to said front wheel; and
    a pair of endless tracks, each of said tracks being entrained about one of said rear wheels and one of said auxiliary wheels.

2. An endless track attachment for a wheeled vehicle, said vehicle having at least one front wheel and a pair of rear wheels, said vehicle also including driving means for said rear wheels, said vehicle further having a main frame for supporting said driving means on said wheels, said main frame including upper and lower members, said attachment comprising:
    an auxiliary frame;
    a pair of auxiliary wheels rotatably attached to said auxiliary frame;
    first means for pivotably attaching said auxiliary frame to at least one of the lower members of said main frame;
    second means for pivotably attaching said auxiliary frame to at least one of the upper members of said main frame;
    said auxiliary frame and said first and second attaching means cooperating to shift at least a portion of vehicle weight from said rear wheels to said front wheel and to said auxiliary wheels; and
    a pair of endless tracks, each of said tracks being entrained about one of said back wheels and one of said auxiliary wheels.

3. An attachment in accordance with claim 2 wherein said second attaching means includes a pair of rigid links with opposite ends attached to said auxiliary frame and at least one of the upper members of said main frame, said second attaching means further including means for holding said pair of links spaced apart from one another.

4. An attachment in accordance with claim 2 wherein said pair of auxiliary wheels are mounted on an axle, said attachment further including third means for attaching said axle to said auxiliary frame, said third attaching means including means for varying the spacing between said axle and said second attaching means.

5. An attachment in accordance with claim 2 wherein said first attaching means includes extendable and retractable means for absorbing shock.

6. An attachment in accordance with claim 2 wherein said second attaching means includes extendable and retractable means for absorbing shock.

7. An attachment in accordance with claim 6 including second means for adjusting the separation between said auxiliary wheels.

8. An endless track attachment for a wheeled vehicle, said vehicle having at least one front wheel and a pair of rear wheels, said vehicle also including driving means for said rear wheels, said vehicle further having a main frame for supporting said driving means on said front and rear wheels, said main frame including upper and lower members, said attachment comprising:
    an auxiliary frame;
    a pair of auxiliary wheels rotatably attached to said auxiliary frame;
    first means for adjusting the separation distance between said auxiliary wheels;
    a pair of endless tracks, each of said tracks being entrained about one of said rear wheels and one of said auxiliary wheels;
    a pair of means for pivotally attaching said auxiliary frame to at least one of the lower members of said main frame, said pair of attaching means being wholly between said pair of endless tracks, said attaching means including second means for adjusting the separation distance of said auxiliary wheels from said rear wheels;
    means for extendably and retractably absorbing shock, said shock absorbing means extending between said auxiliary frame and at least one of the upper members of said main frame, said shock absorbing means being pivotally attached to said auxiliary frame at one end and to said at least one upper member at the other end, said shock absorbing means shifting a substantial portion of vehicle weight from said rear wheels, said shock absorbing means being wholly between said pair of attaching means.

9. The method of installing an endless track attachment to a wheeled vehicle, said vehicle having at least one front wheel and a pair of rear wheels, said vehicle also having driving means for said rear wheels, said vehicle further having a main frame for supporting said driving means on said front wheel and said rear wheels, said main frame including upper and lower members, said attachment including a pair of auxiliary wheels rotatably attached to an auxiliary frame located between said auxiliary wheels, said method comprising the steps of:
    attaching pivotably a pair of rigid members between said auxiliary frame and one of an upper member and a lower member of said main frame;
    entraining an endless track on each set of one of said auxiliary wheels and one of said back wheels; and
    attaching a shock absorber member between said auxiliary frame and the other of the upper member and the lower member of said main frame.

10. The method in accordance with claim 9 including the step of adjusting the separation distance between said auxiliary wheels and said back wheels.

11. The method of claim 9 including the step of adjusting the separation distance between said auxiliary wheels.

* * * * *